Jan. 21, 1930.    M. A. MIKESH    1,744,486
BELT TIGHTENER
Filed Dec. 11, 1926    2 Sheets-Sheet 1
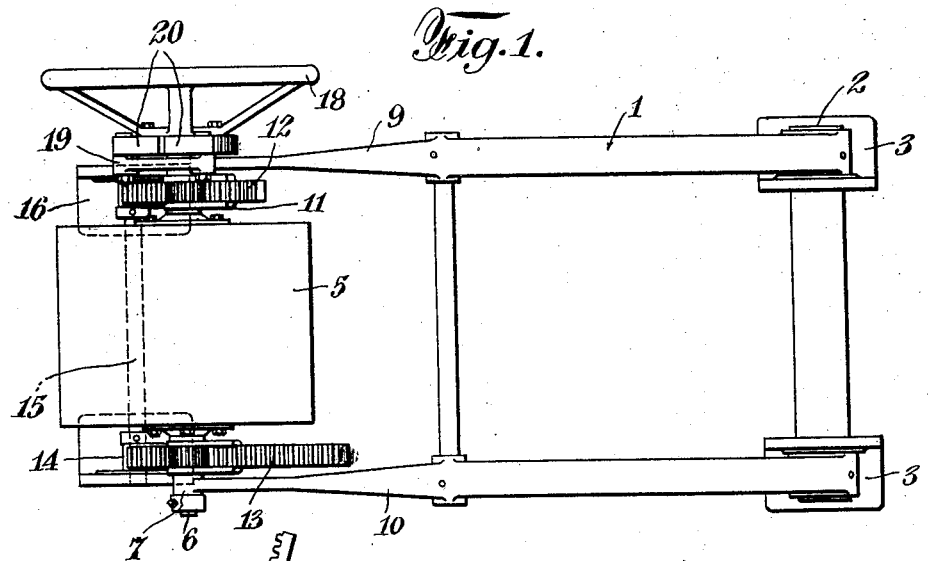
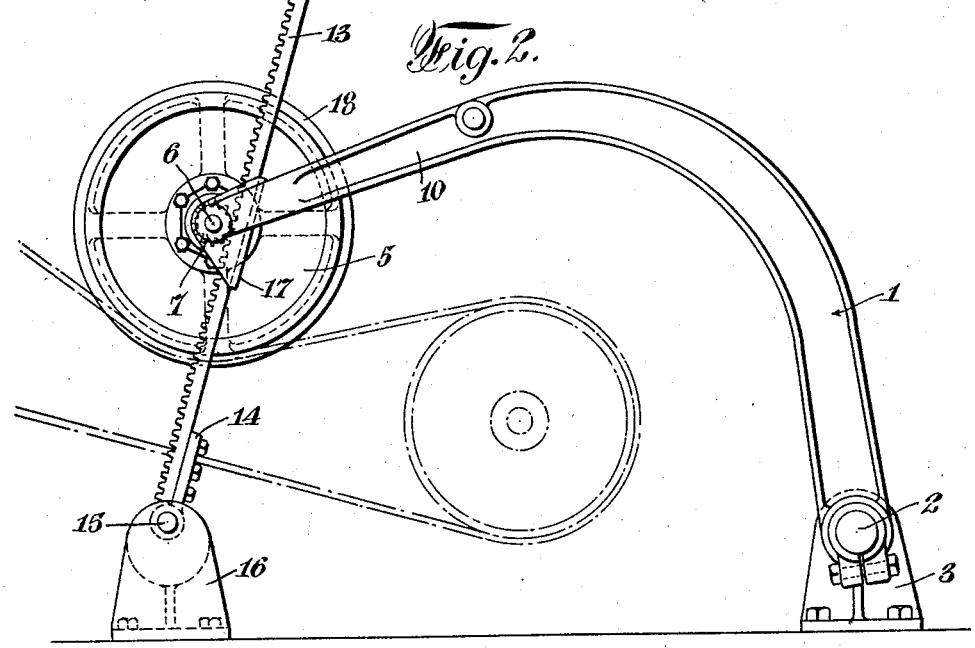
Inventor
Martin A. Mikesh
By his Attorney

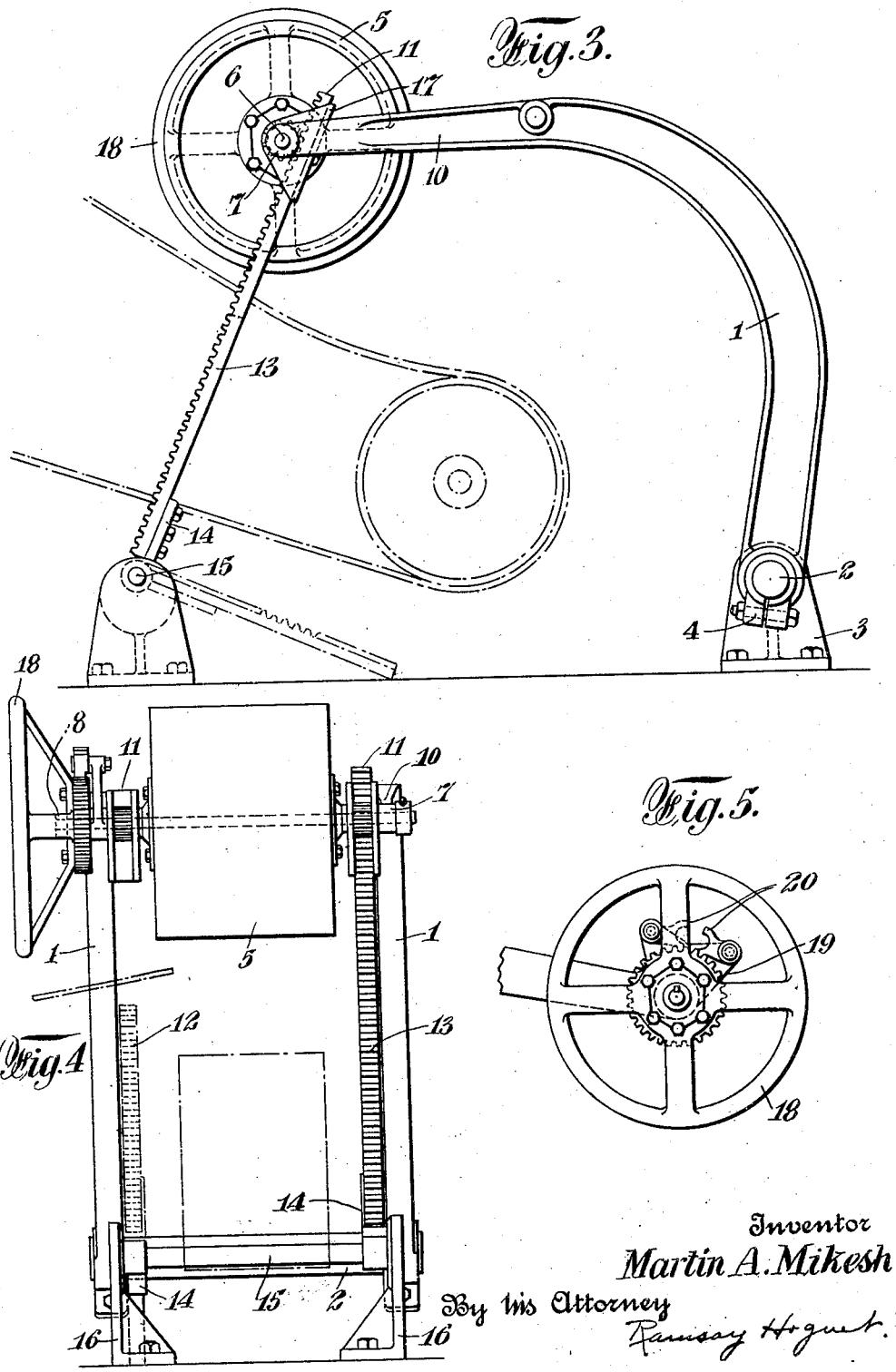

Patented Jan. 21, 1930

1,744,486

UNITED STATES PATENT OFFICE

MARTIN A. MIKESH, OF JERSEY CITY, NEW JERSEY, ASSIGNOR TO THE M. W. KELLOGG COMPANY, A CORPORATION OF DELAWARE

BELT TIGHTENER

Application filed December 11, 1926. Serial No. 154,234.

This invention relates to an apparatus for maintaining a belt in a taut position and more particularly to an apparatus of such a character which permits the belt to be speedily pulled off of its driving member.

Wherever belts are used for power transmission the difficulty is encountered that due to stretching or other causes, the belt becomes loose and tends to slip, thereby causing a very material loss of power. To overcome this difficulty it has heretofore been suggested to employ a device which will exert a variable pressure upon the belt thereby taking up any slack. Devices which have heretofore been used for this purpose, however, are unsatisfactory since they encase the belt and prevent the ready removal of the belt from its pulley or driving member. Since it is often desirable to speedily remove the belt, as for example in case of a break in the machinery, or for other causes, this defect has been a very material one.

It is the object of this invention to provide an apparatus for exercising a variable pressure upon a belt, thereby maintaining it in a taut position with a minimum of friction which will permit the belt to be speedily withdrawn therefrom and disconnected from the driving member.

In carrying out my invention, I provide a contact member adapted to ride on the surface of a belt and having a pivoted supporting frame which is revolvable through a vertical plane and which preferably is also adjustable laterally. The contact member is loosely mounted on a shaft fixed to the supporting frame. While the supporting member may be of any desired form, it is preferably curved in such a manner that when secured to a floor or other foundation near one end of the belt, it will overhang the pulley over which the belt runs. In conjunction with this support, a rack member is provided comprising two arms which are preferably rotatable about their lower ends as axes. This rack member is placed below the belt in such a position that the rack arms may extend upwardly on opposite sides of the belt. The shaft bearing the contact member is provided with gear means which engage the rack arms upon which they may be traveled by a hand wheel or other means provided therefor. In order to maintain the support and rack members in engaged relation a coupling is provided holding the gears in mesh with the rack arms. One of the rack arms is made shorter than the other so that when the contact member is elevated to the top of the longer arm, it will disengage the shorter arm. The other arm is considerably elongated, extending well above the upper surface of the belt. It will thus be seen that when the contact member is elevated, it may be raised above the top of the shorter arm while still remaining in an engaged relation with the longer arm. When the contact member is in this raised position the belt may be slipped over the short arm and readily removed from the driving member. Since this arm is pivoted at its base, as soon as it is disengaged from the contact member it will fall, thus leaving the belt entirely unencased on one side and giving ready access to the belt so that it may speedily be removed from its driving member.

Referring now to the drawings—

Figure 1 is a plan view of the apparatus.

Figure 2 is a side elevation showing the contact member in position against the upper surface of a belt.

Figure 3 is a side elevation showing the contact member in elevated position with the short rack arm disengaged, permitting the belt to be readily withdrawn.

Figure 4 is a front view of the apparatus as shown in Figure 3, showing the contact member elevated upon the longer arm, having disengaged the shorter arm.

Figure 5 is a detailed view showing a dog and ratchet combination for holding the contact member in position upon the rack.

The numeral 1 represents a supporting frame secured to a shaft 2 and pivotable therewith in the brackets 3 and the collar bearings 4. The bracket 3 may be fastened to the floor or other foundation by bolts, screws or other suitable means. At the free end of the frame a roll or contact 5, is loosely mounted on the shaft 6, which is fixed in the bearings 7 and 8 carried by the arms 9 and 10 respectively of the frame 1. Fixed to the shaft 6 on either side of the pulley 5 are the gears 11 adapted to engage with the arms 12 and 13 of a rack member 14. The rack member 14 is pivoted at its lower end at 15 and secured to a bracket 16 fastened to the floor or other foundation. The rack member is placed in position below the belt so that its arms will extend upwardly on opposite sides of the belt. Since both the support frame 1 and the rack member 14 are pivotally mounted, they may be readily moved into position so that the gears 11 on the shaft 6 will engage with the rack arms 12 and 13. In order to keep them in engagement, the coupling members 17 are provided, each forming slideways for the arms 12 and 13, and are journaled on the shaft 6 as shown in Figures 2 and 3. Connected to one end of the shaft 6 is the hand wheel 18 by which the shaft and contact member may be made to travel along the rack arms. The shaft 6 thus serves both as a support for the loosely mounted roll or contact member 5 and as the actuating shaft for traveling the contact member. The ratchet 19 together with the dogs 20, as shown in Figure 5, are provided in order to lock the mechanism in position.

The rack arms 12 and 13 are so designed that one of them will be materially longer than the other. Preferably, the shorter arm is long enough to extend slightly above the top of the belt when it is in a straight position. The other arm is elongated sufficiently so that the roll or contact member 5 may be elevated thereupon far enough to disengage the short arm, which will then fall, allowing the belt to be slipped off of its driving member if desired.

By means of this apparatus it will be readily seen that in cases of emergency or whenever the instant shutting down of the machinery is desired, the roll may be speedily elevated on the longer rack arm and the belt withdrawn from the apparatus at the same time being slipped from its driving pulley.

This apparatus has the further advantage of providing at all times a control preventing the belt from whipping off as it would otherwise tend to do, for example, when the driving power is turned off causing the motor to work against the inertia of the driven pulley.

The use of the loosely mounted roll 5 permits pressure to be exerted upon the belt with a minimum of friction.

While I have disclosed one embodiment of my invention, it will be apparent that many modifications may be made without departing from the spirit of my invention which is to be limited only by the following claims.

I claim:

1. An apparatus for maintaining a belt in a taut position, comprising a contact member, support means for said contact member, a rack member in geared relation with said contact member, said rack member comprising two arms positioned on opposite sides of the belt, one of the arms being reduced in length and releasable from gear connection with the contact member.

2. An apparatus for maintaining a belt in a taut position, comprising a rack member having two arms each pivotally secured at one end, said arms being spaced apart to permit a belt to pass between them, a roll adapted to contact with said belt loosely mounted upon a shaft which is fixed in a flexible frame, said shaft having gear means adapted to engage and travel along said rack arms, one of said rack arms being shortened so that when the roll is elevated to the top of the longer arm the said shortened arm will be disengaged and will fall.

3. In an apparatus for maintaining a belt in a taut position, the combination of a revolvable contact member adapted to ride on the surface of a belt, an adjustable support for said contact member, a rack member pivoted at its lower end and having a long arm and a short arm, means for gearing said contact member to said rack arms, and releasing one of the rack arms, and means for traveling said contact member upon said arms.

4. A belt tightener comprising a rack having two parallel arms, unequal in length, a roll member, means for gearing said roll member to said rack arms and releasing the short arm to permit it to fall away from the roll member and means for traveling said roll upon said rack arms.

5. A belt tightener comprising a rack member having two parallel arms, one of said arms being of greater length than the other, the shorter of said arms being capable of swinging movement to open one side of the rack member, a revolvable contact member loosely mounted upon a shaft, pivoted support means for said shaft, means fixed to said shaft for engaging said rack arms, and control means attached to said shaft by which it may be rotated.

6. A belt tightener comprising a pair of rack arms of unequal length, each of said arms being pivoted at one end, a roll loosely mounted upon a shaft, said shaft being mounted in a pivoted frame, gear means upon said shaft for engaging said rack arms said gear means permitting release of one of the arms, and control means whereby said shaft and said supporting frame may be elevated and depressed.

7. A belt tightener comprising an elongated rack arm, and a shorter rack arm, a roll, means for mounting said roll upon said rack arms, and means for elevating said roll beyond the top of said shorter rack arm for automatically releasing the same.

8. In an apparatus for tightening a belt, the combination of an elongated rack arm and a shorter rack arm parallel therewith, an idler roll journaled in a pivoted supporting frame, means for mounting said roll member between said rack arms, and means for traveling said roll support upon said rack arms, and means for elevating said roll support upon said elongated rack arms, above the top of said shorter rack arm, thereby disengaging said shorter rack arm.

9. In an apparatus for tightening a belt the combination of a long arm and a short arm, said arms being spaced apart, and rotatable about their lower ends, means for engaging said arms, said engaging means supporting a contact member loosely mounted on a shaft, and means for traveling said engaging means along said arms, permitting said contact member to be raised so that said short arm is disengaged and will fall.

10. In a belt tightener comprising a contact member, a support therefore, a rack member in geared relation therewith, a shaft which serves both as a support for said contact member and as an actuating member for traveling said contact member upon said rack member one side of said rack member being capable of opening to permit the belt to be removed from the tightener.

11. In a belt tightener a roll supported on a shaft, a rack member comprising two arms unequal in length, each of said arms being pivoted at its lower end, and means on said shaft for separately engaging said rack arms, said shorter arm being adapted to fall when disengaged.

In testimony whereof, I have signed my name to this specification this 1st day of December, 1926.

MARTIN A. MIKESH.